United States Patent [19]

Roland

[11] Patent Number: 4,765,365

[45] Date of Patent: Aug. 23, 1988

[54] FAUCET SPRING

[75] Inventor: R. Douglas Roland, Zionsville, Ind.

[73] Assignee: Masco Corporation of Indiana, Indianapolis, Ind.

[21] Appl. No.: 83,248

[22] Filed: Aug. 10, 1987

[51] Int. Cl.$^4$ ............................................. F16K 51/00
[52] U.S. Cl. .................. 137/550; 267/166.1; 251/174
[58] Field of Search ............... 137/544, 550; 267/166, 267/166.1; 251/174; 220/86 AT

[56] References Cited

U.S. PATENT DOCUMENTS

| | | | |
|---|---|---|---|
| 1,474,160 | 11/1923 | Nugent . | |
| 2,443,309 | 6/1948 | Dzus . | |
| 2,776,056 | 1/1957 | Douglas | 137/544 X |
| 3,207,010 | 9/1965 | Wendling . | |
| 3,336,942 | 8/1967 | Keith et al. . | |
| 4,017,062 | 4/1977 | Zwirner | 267/166 |
| 4,077,426 | 3/1978 | Karie | 251/174 X |
| 4,240,606 | 12/1980 | Johnson . | |

FOREIGN PATENT DOCUMENTS 1182007  6/1959  France ................ 137/550

Primary Examiner—A. Michael Chambers
Assistant Examiner—John C. Fox
Attorney, Agent, or Firm—Edgar A. Zarins; Steven L. Permut; Leon E. Redman

[57] ABSTRACT

A faucet spring utilized to urge the faucet seal member into sealing contact with the rotatable valving member and prevent large debris, such as valve washer screws from previous faucet assemblies, from contacting the valving member under the fluid pressure. The coil spring has a substantially frusto-conical configuration with a smaller diameter upper end which engages the seal and urges it against the valving member. The larger diameter lower end of the spring engages an annular shoulder of the counterbored inlet passage of the valve assembly. The lower end of the spring also includes an obstruction member formed as an extension of the coil spring which extends into the opening of the spring's lower end to prevent large debris from traveling through the spring and seal. As a result, the faucet spring provides the added function of preventing potentially damaging debris from contacting the valving member.

9 Claims, 1 Drawing Sheet

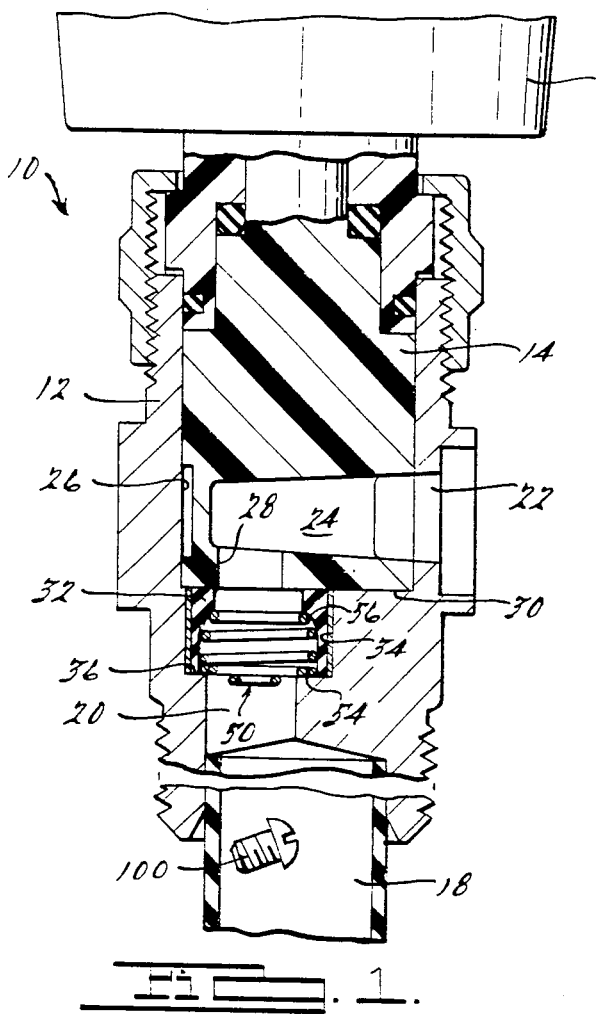
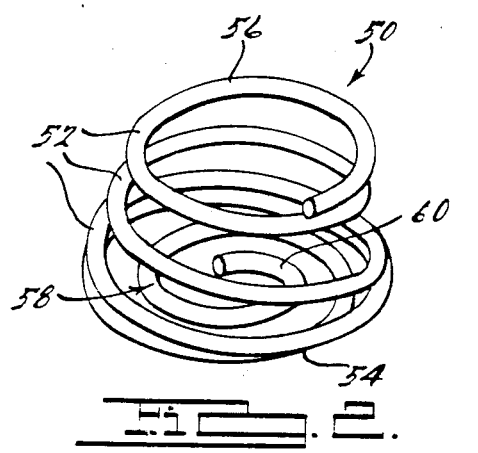
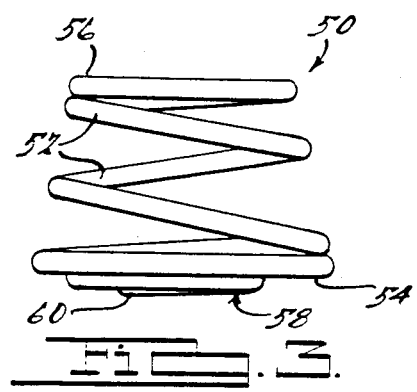
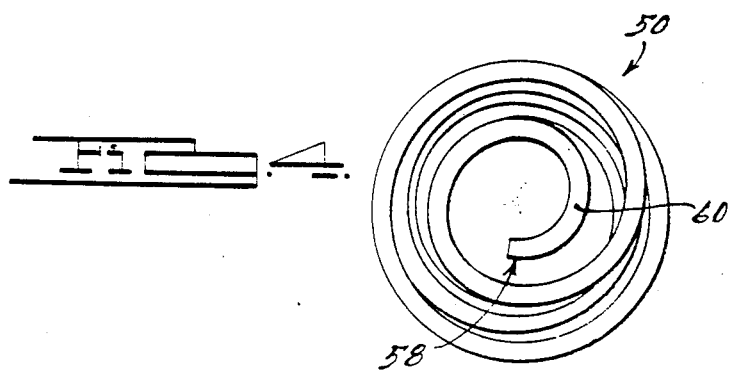
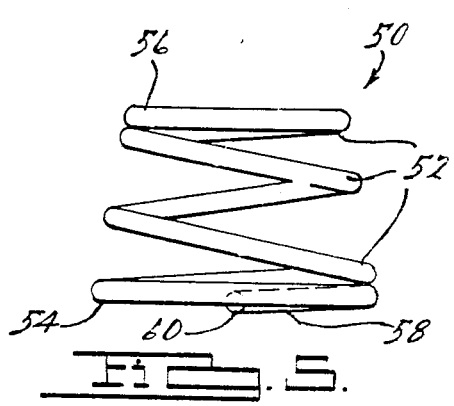
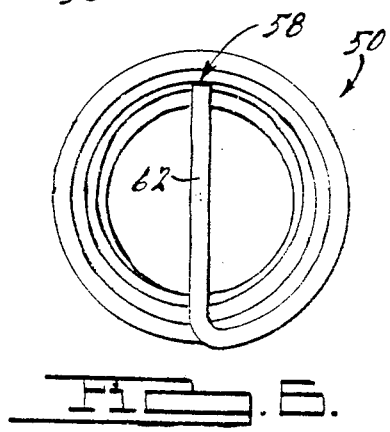

FAUCET SPRING

BACKGROUND OF THE INVENTION

I. Field of the Invention

This invention relates to a coil spring for a faucet assembly and, in particular, to a faucet spring which in addition to urging the seal member into contact with the movable valving member prevents damaging debris from contacting the valving member.

II. Description of the Prior Art

One of the features of a washerless faucet is the resilient seal element which cooperates with the valving member to ensure complete shut-off of fluid flow when the valve is moved to the off position. Generally, the seal element is seated within a smaller secondary bore offset from the center of the main bore which houses the valving member. In order to maintain sealing contact between the seal element and the valving member, means are normally provided to urge the seal against the bottom of the valving member. Such means may be provided by the resilient properties of the seal when the seal element is axially compressed within the secondary bore. Alternatively, a spring may be utilized to urge the seal upwardly to ensure engagement.

Because the seal element and/or the spring form a tubular flow passage leading to the valving member, debris found in the supply lines of the faucet will be forced through the passage under the force of the water pressure into contact with the valving member. Certain types of debris can damage the valving member or jam its operation as it is rotated.

Such damaging debris can even be in the lines unnoticed before the new washerless faucet is installed. Oftentimes the retaining screws for a valve washer in an old faucet can loosen and drop into the supply line. After the old faucet is replaced by the new washerless faucet and the water is turned on, the screw can be forced up against the valving member by the pressure of the fluid flow resulting in damage to the valve. When the water pressure is turned off to investigate the malfunction or to replace the valve, the screw can fall back into the supply line unnoticed. This routine can occur repeatedly until the frustrated consumer gives up on the new faucet assembly. Many times the only evidence of the recurring problem is the set of thread marks left on the valve member by the screw. To date no means have been developed to prevent such large debris from engaging the valve seat while maintaining the efficient operation and low cost of the washerless faucet valve cartridge.

SUMMARY OF THE PRESENT INVENTION

The present invention overcomes the disadvantages of the prior known faucet assemblies by providing a faucet spring adapted to urge the seal member into contact with the valving member while also blocking large debris, such as old loose valve washer screws, from engaging the valving member.

The faucet assembly embodying the present invention includes a valve body having a first axial bore and a second smaller bore offset from the axis of the valve body. A valving member is rotatably disposed within the first bore of the valve body while a seal element is seated within the offset secondary bore. The secondary bore, which forms the inlet passage for the valve, comprises a lower passageway and an upper counterbore within which the seal element is disposed. In order to urge the seal upwardly to maintain sealing contact with the rotatable valving member, a spring extending from the shoulder formed by the counterbore and in contact with the seal element is utilized. Unlike past known faucet springs, however, the spring of the present invention includes means for reducing the cross-sectional area of the flow passage through the spring and seal in order to block any large debris from flowing therethrough.

The faucet spring is in the nature of a coil spring and generally has a frusto-conical configuration with a bottom diameter greater than the top diameter. In this manner, the bottom of the spring is adapted to securely engage the annular shoulder formed by the counterbore while the frusto-conical shape and the top of the spring facilitates engagement with the seal element. Formed at the bottom as an integral extension of the coil spring is a blocking member which extends into the central passage of the spring and seal to reduce the dimensions of the opening although not significantly reducing the flow rate therethrough. In a first preferred embodiment of the spring, the blocking member is formed by a reduced diameter coil of the spring. In a second embodiment, the blocking member consists of a cross member bent across the large diameter opening of the spring. Thus, both embodiments provide integral structural means for preventing large debris found in the supply line from being forced into the faucet housing.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which:

FIG. 1 is a cross-sectional view of a faucet valve assembly embodying the faucet spring of the present invention;

FIG. 2 is an elevated perspective of a first embodiment of the faucet spring;

FIG. 3 is a side view of the faucet spring of FIG. 2;

FIG. 4 is a bottom end view of the faucet spring of FIG. 2;

FIG. 5 is a side view of a second embodiment of the faucet spring embodying the present invention; and FIG. 6 is a bottom end view of the faucet spring of FIG. 5.

DETAILED DESCRIPTION OF A PREFERRED EMBODIMENT OF THE PRESENT INVENTION

Referring first to FIG. 1, there is shown a faucet valve assembly 10 embodying the present invention and generally comprising a valve body 12 and a valving member 14 rotatably disposed within the valve body 12 and connected to an operating member 16 for selectively rotating the valving member 14 within the valve body 12 to control the water flow through the valve 10. The valve assembly 10 is connected to a supply line 18 which communicates with an inlet passageway 20 of the valve body 12. The valve body 12 also includes an outlet passage 22 which fluidly communicates with the faucet spout to deliver water to the user. Fluid flow through the valve assembly 10 is controlled by rotating the valving member 14 within the valve body 12 to selectively bring the fluid passageway 24 into and out of registry with the inlet passageway 20 and the outlet passage 22. As is shown in FIG. 1, the inlet passageway 20 is smaller than the main bore 26 and offset from the rotational axis thereof. As a result, as the valving member 14 is rotated the port 28 formed in the valving surface 30 will be brought into (FIG. 1) and out of registry with the inlet passageway 20.

In order to provide a fluid seal between the inlet passageway 20 and the valving surface 30 of the valving member 14, a substantially tubular seal element 32 is seated within the inlet passageway 20. In a preferred embodiment of the valve assembly 10, the seal element 32 is disposed within a counterbore 34 of the passageway 20 to maintain the proper position of the seal element 32 between the valving surface 30 and an annular shoulder 36 of the counterbore 34.

In the embodiments of the present invention, a faucet spring 50 is utilized to bias the seal element 32 against the valving surface 30 of the valving member 14. As illustrated in FIGS. 1–4, the faucet spring 50 is in the form of a compressible coil spring having a plurality of helical coils 52 with a central passage extending through the spring 50. The faucet spring 50 of the present invention preferably has a substantially frusto-conical configuration with a lower end 54 of greater diameter than the upper end 56 of the spring. The faucet spring 50 is disposed within the counterbore 34 of the inlet passageway 20 such that the lower end 54 of the spring 50 engages the annular shoulder 36 of the counterbore 34. The upper end 56 of the spring 50 and the general frusto-conical shape thereof act against the seal element 32 to urge it into contact with the valving member 14. When fluid flow is initiated the water flows through the inlet passageway 20 and the passage through the seal and spring.

In addition to the general coil structure of the faucet spring 50, the spring includes means 58 for preventing large debris components from traveling through the central passage of the seal and spring into damaging contact with the valving member 14. Debris, such as old valve washer screws 100 from previous faucet assemblies, can be forced up the supply line 18 under the pressure of the water thereby damaging the valving member 14. The preventing means 58 stops such debris from contacting the valving member 14. In a first embodiment of the present invention shown in FIGS. 2–4, the preventing means 58 comprises a reduced diameter coil 60 forming as an integral extension of the main coils 52 of the spring. In addition to maintaining the general helical shape of the coil spring thereby reducing manufacturing costs, the reduced coil effectively reduces the dimensions of the bottom opening of the spring 50 to block debris without significantly reducing flow volume through the inlet passageway 20. This is because any flow restriction occurs at the upper end of the spring 50 first by the reduced flow passage formed by the seal 32 and then the inlet port 28. The lower end 54 of the spring 50 is, in essence, oversized to accommodate the required flow rate and, thus, the blocking means 58 does not significantly reduce the rate of fluid flow through the valve 10.

In a second embodiment of the invention shown in FIGS. 5 and 6, the preventing means comprises a cross member 62 which bisects the bottom opening of the spring 50. Again, while reducing the dimensions of the passage through which debris may pass, fluid flow is not significantly reduced. The cross member 62 is an integral extension of the coil spring and is formed simply by bending the end portion of the spring perpendicularly across the bottom face of the spring.

Thus, the present invention provides simple, economical to manufacture and efficient means for preventing damaging debris from coming into contact with the valving member. Although the present invention has been described in conjunction with a rotatable valve assembly, the faucet spring 50 can similarly be utilized in conjunction with a ball-type valving member wherein the spring 50 urges the seal element against the valving surface of the ball-type valving member.

The foregoing detailed description has been given for clearness of understanding only and no unnecessary limitations should be understood therefrom as some modifications will be obvious to those skilled in the art without departing from the scope and spirit of the appended claims.

I claim:

1. In a faucet valve assembly having a valve body with a main bore and an inlet passageway leading from a supply of water under pressure to the main bore, a valving member movably disposed in the bore of the valve body and having a valving surface, selectively operable drive means for moving the valving member within the valve body relative to the inlet passageway, and a tubular seal element in the inlet passageway of the valve body, the improvement comprising:
   a faucet spring disposed in the inlet passageway for biasing the seal element agains the valving surface of the valving member, said faucet spring having a plurality of helical coils forming a central flow passageway and a lower terminal end forming an integral extension of said helical coils of said coil spring, said lower terminal extension of said coil spring extending into said central flow passageway to prevent debris from traveling into said central flow passageway of said spring whereby such debris is prevented from traveling through the inlet passageway of the valve body in conjunction with the water flowing through said spring and seal member to the valving member.

2. The faucet spring as defined in claim 1 wherein said spring is a resiliently compressible coil spring having a substantially frusto-conical configuration with the lower end diameter larger than the upper end diameter of said spring.

3. The faucet spring as defined in claim 2 wherein said lower terminal extension of said coil spring for preventing debris from traveling into said central flow passageway of said spring is a reduced diameter coil of said spring spiraling inwardly at the lower end of said spring, said reduced diameter coil forming an integral extension of said helical coils at the lower end of said spring.

4. The faucet spring as defined in claim 3 wherein said reduced diameter coil formed at the lower end of said spring has a diameter smaller than the upper end diameter of said spring.

5. The faucet spring as defined in claim 2 wherein said lower terminal extension of said coil spring for preventing debris from traveling into said central flow passageway of said spring is a cross member extending diametrically across the lower end of said central flow passageway of said spring, said cross member extending integrally from said helical coils at the lower end of said spring.

6. The faucet spring as defined in claim 2 wherein said spring and seal element are seated within a counterbore of the inlet passageway, the lower end of said spring engaging an annular shoulder of the counterbore and the upper end of said spring engaging the seal element to bias the seal against the valving surface of the valving member.

7. In a faucet valve assembly having a valve body with a main bore and an inlet passageway leading from a supply of water under pressure to the main bore, a valving member movably disposed in the main bore of the valve body and having a valving surface, selectively operable driving means for moving the valving member within the valve body relative to the inlet passageway, and a tubular seal element seated within a counterbore of the inlet passageway of the valve body, the improvement comprising:

a faucet spring disposed in the counterbore of the inlet passageway for biasing the seal element against the valving surface of the valving member, said faucet spring comprising a resiliently compressible coil spring having a substantially frusto-conical configuration, said spring including a plurality of helical coils forming a central flow passageway, a lower end of said spring engaging an annular shoulder of the counterbore and an upper end of said spring engaging the seal element, said faucet spring including a reduced diameter coil of said spring spiraling inwardly at the lower end of said spring, said reduced diameter coil forming an integral extension of said helical coils at the lower end of said spring and preventing debris from traveling into said central flow passageway of said spring in conjunction with the water flowing through the inlet passageway to the valving member.

8. The faucet spring as defined in claim 7 wherein said reduced diameter coil formed at the lower end of said spring has a diameter smaller than the upper end diameter of said frusto-conical spring.

9. In a faucet valve assembly having a valve body with a main bore and an inlet passageway leading from a supply of water under pressure to the main bore, a valving member movably disposed in the main bore of the valve body and having a valving surface, selectively operable drive means for moving the valving member within the valve body relative to the inlet passageway, and a tubular seal element seated within a counterbore of the inlet passageway of the valve body, the improvement comprising:

a faucet spring disposed in the counterbore of the inlet passageway for biasing the seal element against the valving surface of the valving member, said faucet spring comprising a resiliently compressible coil spring having a substantially frusto-conical configuration, said spring including a plurality of helical coils forming a central flow passageway, a lower end of said spring engaging an annular shoulder of the counterbore and an upper end of said spring engaging the seal element, said faucet spring including a cross member forming an integral extension of said helical coils at the lower end of said spring, said cross member extending diametrically across the lower end of said central flow passageway of said spring and preventing debris from traveling into said central flow passageway of said spring in conjunction with the water flowing through the inlet passageway to the valving member.

* * * * *